(12) United States Patent
Weng et al.

(10) Patent No.: US 11,914,116 B2
(45) Date of Patent: Feb. 27, 2024

(54) OPTICAL SYSTEM

(71) Applicant: TDK TAIWAN CORP., Taoyuan (TW)

(72) Inventors: Chih-Wei Weng, Taoyuan (TW);
Chao-Chang Hu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 125 days.

(21) Appl. No.: 17/370,339

(22) Filed: Jul. 8, 2021

(65) Prior Publication Data

US 2022/0011555 A1 Jan. 13, 2022

Related U.S. Application Data (60) Provisional application No. 63/050,503, filed on Jul. 10, 2020.

(51) Int. Cl.
*G02B 13/00* (2006.01)
*G02B 3/14* (2006.01)
*G02B 7/18* (2021.01)
*G02B 27/64* (2006.01)

(52) U.S. Cl.
CPC ............ *G02B 13/0065* (2013.01); *G02B 3/14* (2013.01); *G02B 7/1805* (2013.01); *G02B 27/646* (2013.01)

(58) Field of Classification Search
CPC .... G02B 13/0065; G02B 3/14; G02B 7/1805; G02B 27/646; G02B 7/09; G02B 7/04; G02B 7/1821; G02B 26/004; G03B 5/00; G03B 3/10; G03B 2205/0023; G03B 2205/0046; G03B 17/17; G03B 30/00
See application file for complete search history.

(56) References Cited

U.S. PATENT DOCUMENTS

| | | | |
|---|---|---|---|
| 2010/0188551 A1* | 7/2010 | Nagaoka | G02B 7/025 29/458 |
| 2016/0202455 A1* | 7/2016 | Aschwanden | G02B 13/0075 359/666 |
| 2020/0301116 A1* | 9/2020 | Aschwanden | G02B 13/009 |
| 2021/0048628 A1* | 2/2021 | Shabtay | G02B 9/64 |
| 2022/0294945 A1* | 9/2022 | Zhao | G03B 11/045 |

FOREIGN PATENT DOCUMENTS

WO WO-2019205789 A1 * 10/2019 ............. G02B 15/04

OTHER PUBLICATIONS

Machine translation of WO-2019205789-A1 (Year: 2019).*

* cited by examiner

*Primary Examiner* — Darryl J Collins
*Assistant Examiner* — Matthew Y Lee
(74) *Attorney, Agent, or Firm* — MUNCY, GEISSLER, OLDS & LOWE, P.C.

(57) ABSTRACT

An optical system for receiving rays of light is provided in the present disclosure, including a first optical module. The first optical module includes a first optical element and a first optical path-adjusting element. The first optical element has a first optical axis. The rays of light pass through the first optical element in a first direction. The first optical path-adjusting element corresponds to the first optical element. The rays of light are redirected to a second direction by the first optical path-adjusting element. The first optical element and the first optical path-adjusting element are arranged along the first optical axis.

23 Claims, 7 Drawing Sheets

OPTICAL SYSTEM

CROSS REFERENCE TO RELATED APPLICATIONS

This application claims the benefit of U.S. Provisional Application No. 63/050,503, filed Jul. 10, 2020, the entirety of which is incorporated by reference herein.

BACKGROUND OF THE INVENTION

Field of the Invention

The present disclosure relates to an optical system, and more particularly to an optical system that may include multiple optical modules.

Description of the Related Art

As technology has developed, it has become more common to include image-capturing and video-recording functions into many types of modern electronic devices, such as notebooks computers, smartphones, and digital cameras. These electronic devices are used more and more often, and new models have been developed that are convenient, thin, and lightweight, offering more choices for consumers.

Electronic devices that have image-capturing or video-recording functions normally include one or more lenses, thereby performing such functions as auto focus (AF), zooming, and optical image stabilization (OIS). However, the trend in modern mobile devices is to have a higher image quality within limited volumes. As a result, the present disclosure provides an optical system different from the prior ones, to increase its optic quality and also achieve miniaturization.

BRIEF SUMMARY OF THE INVENTION

An optical system for receiving rays of light is provided in the present disclosure, including a first optical module. The first optical module includes a first optical element and a first optical path-adjusting element. The first optical element has a first optical axis. The rays of light pass through the first optical element in a first direction. The first optical path-adjusting element corresponds to the first optical element. The rays of light are redirected to a second direction by the first optical path-adjusting element. The first optical element and the first optical path-adjusting element are arranged along the first optical axis.

In some embodiments of the present disclosure, the first optical element has a first surface and a second surface. The first surface faces the first optical path-adjusting element. The first surface has a planar structure that is not parallel to the first optical axis. The second surface is opposite to the first surface. The second surface has a non-planar structure that is not parallel to the first optical axis. The first surface and the second surface are arranged along the first optical axis. The first optical path-adjusting element has a third surface facing the first optical element. The third surface has a planar structure. The first surface and the third surface are parallel. There is a gap between the first surface and the third surface. There is gas inside the gap. In some embodiments, the first surface is perpendicular to the first optical axis, and the second surface has a curved structure.

In some embodiments of the present disclosure, the first optical module further includes a positioning assembly disposed between the first optical element and the first optical path-adjusting element, for maintaining the gap between them. The gas inside the gap is atmospheric air.

In some embodiments of the present disclosure, the first optical module further includes a first driving assembly disposed at the first optical element, varying the structure of the second surface. The second surface has a curvature that is adjustable by the first driving assembly, whereby the state of the rays of light passing through the first optical element is adjusted.

In some embodiments of the present disclosure, the first optical module further includes a first movable portion and a first fixed portion. The first movable portion is connected to the first optical element. The first fixed portion has a first housing. The first housing has a first accommodating space, in which the first optical path-adjusting element is accommodated. The first movable portion is movable relative to the first fixed portion. The first driving assembly drives the first movable portion to move relative to the first fixed portion. When viewed along the first optical axis, the first driving assembly and the first optical path-adjusting element do not overlap.

In some embodiments of the present disclosure, the first optical path-adjusting element does not move relative to the first fixed portion. The first optical path-adjusting element includes a glass material.

In some embodiments of the present disclosure, the optical system further includes a second optical module. The second optical module includes a second optical element having a second optical axis, wherein the second optical axis is parallel to the second direction. The first optical module and the second optical module are arranged along the second optical axis. The first driving assembly at least partially overlaps the second optical module, and the first optical element at least partially overlaps the second optical module when viewed along the second optical axis. In some embodiments, the first optical axis is perpendicular to the second optical axis.

In some embodiments of the present disclosure, the second optical module further includes a second fixed portion having a second housing. The second housing has a second accommodating space, in which the second optical element is accommodated. The second housing is fixedly connected to the first optical module.

In some embodiments of the present disclosure, the second optical module further includes a second movable portion, a second driving assembly, and a third optical element. The second movable portion is connected to the second optical element. The second driving assembly drives the second movable portion to move relative to the second fixed portion. The third optical element is accommodated in the second accommodating space. The third optical element and the second optical element are arranged along the second optical axis. A first diopter of the first optical element is greater than a second diopter of the second optical element and a third diopter of the third optical element. The third diopter is different from the second diopter.

In some embodiments of the present disclosure, the first driving assembly varies the first diopter of the first optical element within a first range. Any number within the first range is greater than the second diopter and the third diopter.

In some embodiments of the present disclosure, the third optical element is fixedly disposed at the second fixed portion. The second optical element is movable relative to the third optical element.

In some embodiments of the present disclosure, the first optical element includes liquid, the second optical element includes a plastic material, and the third optical element includes a glass material.

In some embodiments of the present disclosure, the rays of light pass through the first optical element, the first optical path-adjusting element, the second optical element and the third optical element in sequence.

In some embodiments of the present disclosure, the optical system further includes a third optical module. The third optical module includes a second optical path-adjusting element. The rays of light are redirected from the second direction to a third direction by the second optical path-adjusting element. No two of the first direction, the second direction, and the third direction are parallel.

In some embodiments of the present disclosure, the first optical module further includes a third driving assembly driving the first optical path-adjusting element to rotate about a first rotational axis. The first rotational axis is perpendicular to both the first direction and the second direction.

In some embodiments of the present disclosure, the third optical module further includes a fourth driving assembly driving the second optical path-adjusting element to rotate about a second rotational axis. The first rotational axis is not parallel to the second rotational axis. The second rotational axis is perpendicular to both the second direction and the third direction.

In some embodiments of the present disclosure, of the first direction, the second direction, and the third direction, two are perpendicular to each other. The first rotational axis is perpendicular to the second rotational axis.

In some embodiments of the present disclosure, the optical system further includes a photosensing element having a photosensing surface. The photosensing surface faces the third optical module. After passing through the second optical path-adjusting element of the third optical module, the rays of light reach the photosensing element.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various embodiments. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used for ease of the present disclosure of one features relationship to another feature. The spatially relative terms are intended to cover different orientations of the device including the features.

An optical system is provided in the present disclosure, wherein one or more optical elements for refracting and/or reflecting rays of light are disposed on the path of the light, changing the direction that the rays of light travel in, thereby achieving miniaturization of the mechanism. In addition, the light receiving angle of the optical system may be increased by installing multiple optical elements with different diopters. Thus, the optical system may absorb light in a wide angle.

Figure 1:
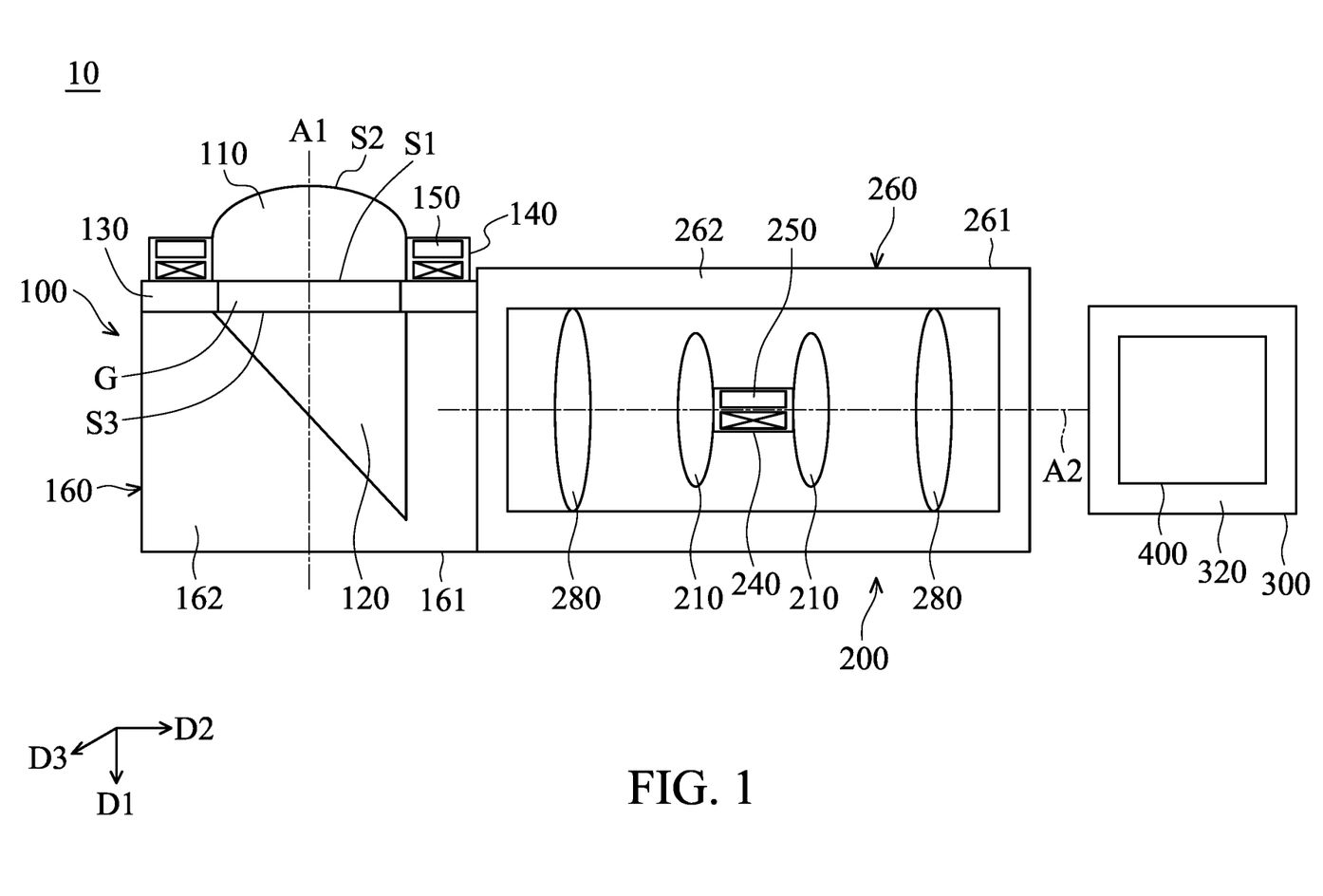
FIG. 1 is a side view of the optical system, according to some embodiments of the present disclosure.

Firstly, referring to FIG. 1, FIG. 1 is a side view of an optical system 10, according to some embodiments of the present disclosure. In the embodiment shown in FIG. 1, the optical system 10 includes a first optical module 100, a second optical module 200, a third optical module 300, and a photosensing element 400. The first optical module 100, the second optical module 200, and the third optical module 300 are arranged substantially in a linear manner. In this embodiment, the first optical module 100, the second optical module 200, and the third optical module 300 are arranged substantially along the horizontal direction.

In some embodiments, the first optical module 100 includes a first optical element 110, a first optical path-adjusting element 120, a positioning assembly 130, a first driving assembly 140, a first movable portion 150, and a first fixed portion 160. The first optical element 110 has a first optical axis A1 that substantially passes through the center of the first optical element 110. Rays of light (e.g. visible light or invisible light) may enter the entire optical system 10 by going through the first optical element 110. In some embodiments, the first optical element 110 may be a liquid lens, including water, electrolytic water, oil, or any other suitable fluid substances contained therein. The first optical element 110 may be utilized to receive the rays of light mentioned above. By varying the diopter of the first optical element 110, the state of the light may be adjusted. For example, the extent of converging and/or diverging the light beams may be adjusted. This is advantageous for the zooming effect of the optical system 10. In some embodiments, the first optical element 110 is utilized to focus the light. Additionally, the range of receiving rays of light may be changed by varying the structure of the first optical element 110, so that light may be absorbed in a wider angle while its volume remains unchanged. The adjustment of the first optical element 110 will be described in detail hereinafter.

In the embodiment shown in FIG. 1, the first optical path-adjusting element 120 is a prism having a surface that may reflect rays of light (the tilted surface with respect to the horizontal direction and the vertical direction in FIG. 1). The first optical path-adjusting element 120 corresponds to the first optical element 110. For example, the first optical path-adjusting element 120 is disposed right beneath the first optical element 110. In some embodiments, the first optical element 110 and the first optical path-adjusting element 120 are arranged along the first optical axis A1. In some embodiments, rays of light pass through the first optical element 110 in a first direction D1. When the light arrives at the reflecting surface of the first optical path-adjusting element 120, its traveling direction is changed into a second direction D2 that is different from the first direction D1 by the first optical path-adjusting element 120. For an easier and more concise illustration, in the figures of the present disclosure, the first direction D1 is shown as the vertical direction in the drawings and the second direction D2 is shown as the horizontal direction in the drawings. However, it should be understood that rays of light may reach the first optical element 110 in any angles that can be received by the first optical element 110. All of the directions of the incident rays of light may be referred to as the first direction D1. After being reflected by the first optical path-adjusting element 120, the rays of light may be emitted in multiple different directions dependent on all the different first directions D1. All of these emitting directions of the light may be referred to as the second direction D2.

In some embodiments, the first optical element 110 has a first surface S1 and a second surface S2, and the first optical path-adjusting element 120 has a third surface S3. Both the first surface S1 and the second surface S2 of the first optical element 110 are not parallel to the first optical axis A1. In some embodiments, the first surface S1 is perpendicular to the first optical axis A1. Both the first surface S1 of the first optical element 110 and the third surface S3 of the first optical path-adjusting element 120 have planar structures, facing each other. In the embodiment shown in FIG. 1, the first surface S1 and the third surface S3 are parallel. There is a gap G between the first surface S1 and the third surface S3. In some embodiments, there may be gas (e.g. atmospheric air) inside the gap G. In some other embodiments, the gap G may be vacuum. In yet some other embodiments, the first surface S1 and the third surface S3 may be in contact without a gap. In some embodiments where there is a gap G between the first surface S1 and the third surface S3, a positioning assembly 130 is disposed between the first optical element 110 and the first optical path-adjusting element 120 for maintaining the distance between the first surface S1 and third surface S3, so that the gap G remains unchanged.

Figure 2:
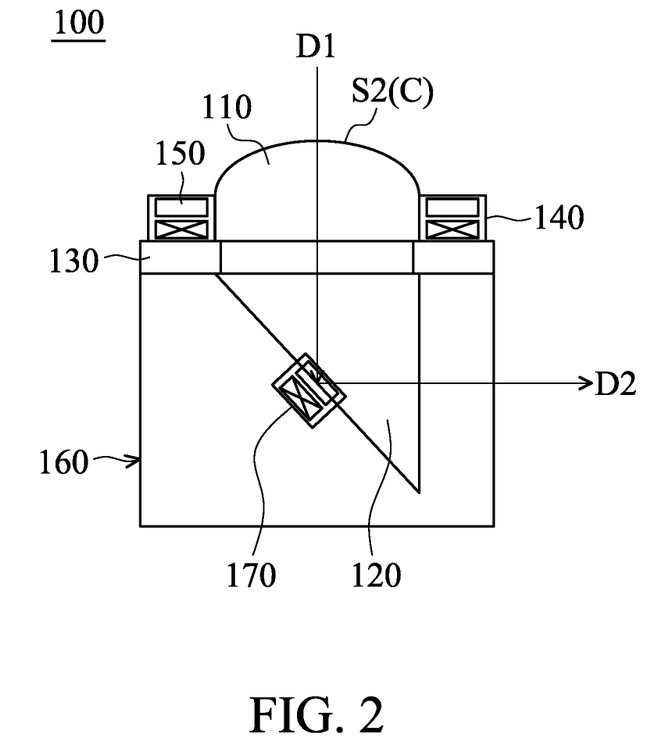
FIG. 2 is a side view of the first optical module, according to some embodiments of the present disclosure.

Referring to FIG. 1 along with FIG. 2, FIG. 2 is a side view of the first optical module 100, according to some embodiments of the present disclosure. The second surface S2 of the first optical element 110 is located opposite to the first surface S1. The first surface S1 and the second surface S2 are arranged along the first optical axis A1. The second surface S2 is closer to the light incidence side of the first optical element 110 than the first surface S1. The second surface S2 has a non-planar structure, such as a convex structure, a spherical structure, a curved structure, or any suitable regular or irregular surface structure. The second surface S2 has a curvature C which may be adjusted by the first driving assembly 140, thereby adjusting the state of light passing through the first optical element 110 (e.g. the state and extent of convergence or divergence of the light beams). The first driving assembly 140 is disposed at the first optical element 110. For example, the first driving assembly 140 may be disposed on the side of the first optical element 110, or any suitable locations. In the embodiments shown in FIGS. 1 and 2, the first optical module 100 includes two first driving assemblies 140. However, the amount of the first driving assemblies 140 is not limited thereto. In some other embodiments, the first optical module 100 may include any suitable amount of the first driving assemblies 140, such as one, four or six first driving assemblies 140. The second surface S2 may be deformed by the first driving assembly 140. For example, the first driving assembly 140 may include a fixed coil and a movable magnetic element, wherein the magnetic element may be connected to the first optical element 110. By moving the magnetic element, the liquid inside the first optical element 110 may be compressed, changing its shape, and thus resulting in different curvatures C of the second surface S2. With the different curvatures C, the position of the first optical axis A1 may be adjusted. Advantageously, while the volume of the first optical element 110 remains unchanged, other than achieving optical zooming, the range of receiving rays of light may be increased by varying the curvature C of the second surface S2, therefore improving the optic quality.

In addition to using coils and magnetic elements to change the curvature of the second surface S2, a piezoelectric mechanism (not shown) may also be provided to change the curvature C of the second surface S2 in a physical manner in some other embodiments. More specifically, a piezoelectric sheet may be arranged under the first optical element 110, and the first optical element 110 is squeezed by the piezoelectric sheet that deforms after a voltage is applied, thereby changing the curvature C of the second surface S2. Alternatively, in yet some other embodiments, the second surface S2 may be driven to deform by connecting a circuit component (not shown) to the first optical element 110. More specifically, the second surface S2 generates a dielectric force by applying a voltage, and the liquid inside the first optical element 110 will be squeezed by the dielectric force, thereby changing the curvature C of the second surface S2. In other words, the curvature C of the second surface S2 may be controlled using any suitable method to achieve the desired optical effect.

In some embodiments, the first movable portion 150 of the first optical module 100 is connected to the first optical element 110 and movable relative to the first fixed portion 160. In some embodiments, the first movable portion 150 may be the magnetic element in the first driving assembly 140 mentioned above, while the coil in the first driving assembly 140 is secured to the first fixed portion 160. The first fixed portion 160 has a first housing 161 with a first accommodating space 162. The first optical path-adjusting element 120 is accommodated in the first accommodating space 162. The first driving assembly 140 may drive the first movable portion 150 to move relative to the first fixed portion 160. When viewed along the first optical axis A1 (i.e. the vertical direction in the drawings), the first driving assembly 140 does not overlap the first optical path-adjusting element 120. As such, the miniaturization of the entire optical system 10 on the direction of the first optical axis A1 may be approved.

Referring to FIG. 1 again, in some embodiments, the second optical module 200 includes a second optical element 210, a second driving assembly 240, a second movable portion 250, and a second fixed portion 260. The second optical element 210 may be a lens having a second optical axis A2 that substantially passes through the center of the second optical element 210. The first optical module 100 and the second optical module 200 are arranged along the second optical axis A2. In some embodiments, the first driving assembly 140 of the first optical module 100 at least partially overlaps the second optical module 200 and the first optical element 110 of the first optical module 100 at least partially overlaps the second optical module 200 as well when viewed along the second optical axis A2. In some embodiments, the first optical axis A1 of the first optical element 110 is perpendicular to the second optical axis A2 of the second optical element 210. In the embodiments shown in FIG. 1, the second optical module 200 includes two second optical elements 210. However, the amount of the second optical elements 210 is not limited thereto. In some other embodiments, the second optical module 200 may include any suitable amount of the second optical elements 210, such as one, three or four second optical elements 210.

In some embodiments, the second movable portion 250 of the second optical module 200 is connected to the second optical element 210 and movable relative to the second fixed portion 260. In some embodiments, the second movable portion 250 may be a magnetic element in the second driving assembly 240, while a coil in the second driving assembly 240 may be secured to the second fixed portion 260. The second fixed portion 260 has a second housing 261 with a second accommodating space 262. The second optical element 210 is accommodated in the second accommodating space 262. The second housing 261 is fixedly connected to the first optical module 100. In particular, the second housing 261 is fixedly connected to the first housing 161 of the first optical module 100. The second driving assembly 240 may drive the second movable portion 250 to move relative to the second fixed portion 260, so that the second movable portion 250 brings the second optical element 210 to move relative to the second fixed portion 260, achieving the effect of optical zooming.

In some embodiments, the second optical module 200 may further include a third optical element 280. The third optical element 280 may be a lens, accommodated in the second accommodating space 262 together with the second optical element 210. The third optical element 280 and the second optical element 210 are arranged along the second optical axis A2. In the embodiment shown in FIG. 1, the second optical module 200 includes two third optical elements 280. However, the amount of the third optical elements 280 is not limited thereto. In some other embodiments, the second optical module 200 may include any suitable amount of the third optical elements 280, such as one, three or four third optical elements 280. For example, in some embodiments, the second optical module 200 may only include one third optical element 280 that is located on one of the sides either closer to the third optical module 300 or closer to the first optical module 100. In some embodiments, the first diopter of the first optical element 110 is greater than the second diopter of the second optical element 210 and the third diopter of the third optical element 280, wherein the second diopter is different from the third diopter. However, in other embodiments, the first diopter, the second diopter, and the third diopter may be adjusted based on practical requirements. In some embodiments that include multiple second optical elements 210 or multiple third optical elements 280, multiple second diopters and multiple third diopters thereof may also be different from each other.

As mentioned above, the curvature C of the second surface S2 of the first optical element 110 may be adjusted by the first driving assembly 140 and therefore the diopter (i.e. the state and extent of convergence or divergence of the light beams) thereof may be changed. In some embodiments, the first driving assembly 140 may vary the first diopter of the first optical element 110 within a first range. Any number within the first range is greater than the second diopter and the third diopter. In some embodiments where the second optical module 200 includes multiple optical elements, any number within the first range is greater than the diopter of any optical element accommodated by the second optical module 200. With the configuration of the diopters in the present disclosure, more rays of light may be received in a wider angle with a limited volume of the optical system 10, improving its optic quality and miniaturization.

In some embodiments, the third optical element 280 may be fixedly disposed at the second fixed portion 260. The second driving assembly 240 drives the second movable portion 250 to move, bringing the second optical element 210 to move relative to the second fixed portion 260, and thereby bringing the second optical element 210 to move relative to the third optical element 280. In such embodiments, the second optical element 210 may have a plastic material, and the third optical element 280 may have a glass material. In general, since glass is heavier than plastic, by securing the third optical element 280 made of glass and moving the second optical element 210 made of plastic, the overall stability of the mechanism may be improved and the driving efficiency optimized, in addition to achieving the effect of optical zooming. Additionally, in some embodiments, the position of the optical axis of the entire second optical module 200 may be adjusted by moving the second optical element 210, achieving various optical effects.

Still referring to FIG. 1, the third optical module 300 includes a second optical path-adjusting element 320. The second optical path-adjusting element 320 is a prism having a surface that may reflect rays of light. After passing through the second optical module 200, the rays of light enter the second optical path-adjusting element 320 in the second direction D2. The traveling direction is then changed into a third direction D3 through the reflecting surface of the second optical path-adjusting element 320. As mentioned above, after reflecting by the second optical path-adjusting element 320, the rays of light may be emitted in multiple different directions dependent on all the different second directions D2. All of these emitting directions of the light may be referred to as the third direction D3. In some embodiments, of the first direction D1, the second direction D2, and the third direction D3, no two are parallel. In the embodiment shown in FIG. 1, of the first direction D1, the second direction D2, and the third direction D3, two may be perpendicular.

After passing through the second optical path-adjusting element 320 of the third optical module 300, the rays of light enter the photosensing element 400 in the third direction D3. The photosensing element 400 has a photosensing surface 410 (shown in FIG. 5) which faces the third optical module 300, receiving the light emitted by the third optical module 300. In some embodiments, there may be additional optical element(s) disposed between the photosensing surface 410 and the third optical module 300 for converging the light emitted by the third optical module 300, so that the rays of light may be focused on the photosensing surface 410 to improve the quality and effect of photosensing. Additionally, it should be noted that the dimension of the photosensing element 400 is not limited to that shown in the drawings. In fact, the dimensions of the photosensing element 400 may be increased or reduced in accordance with practical requirements.

Figure 3:
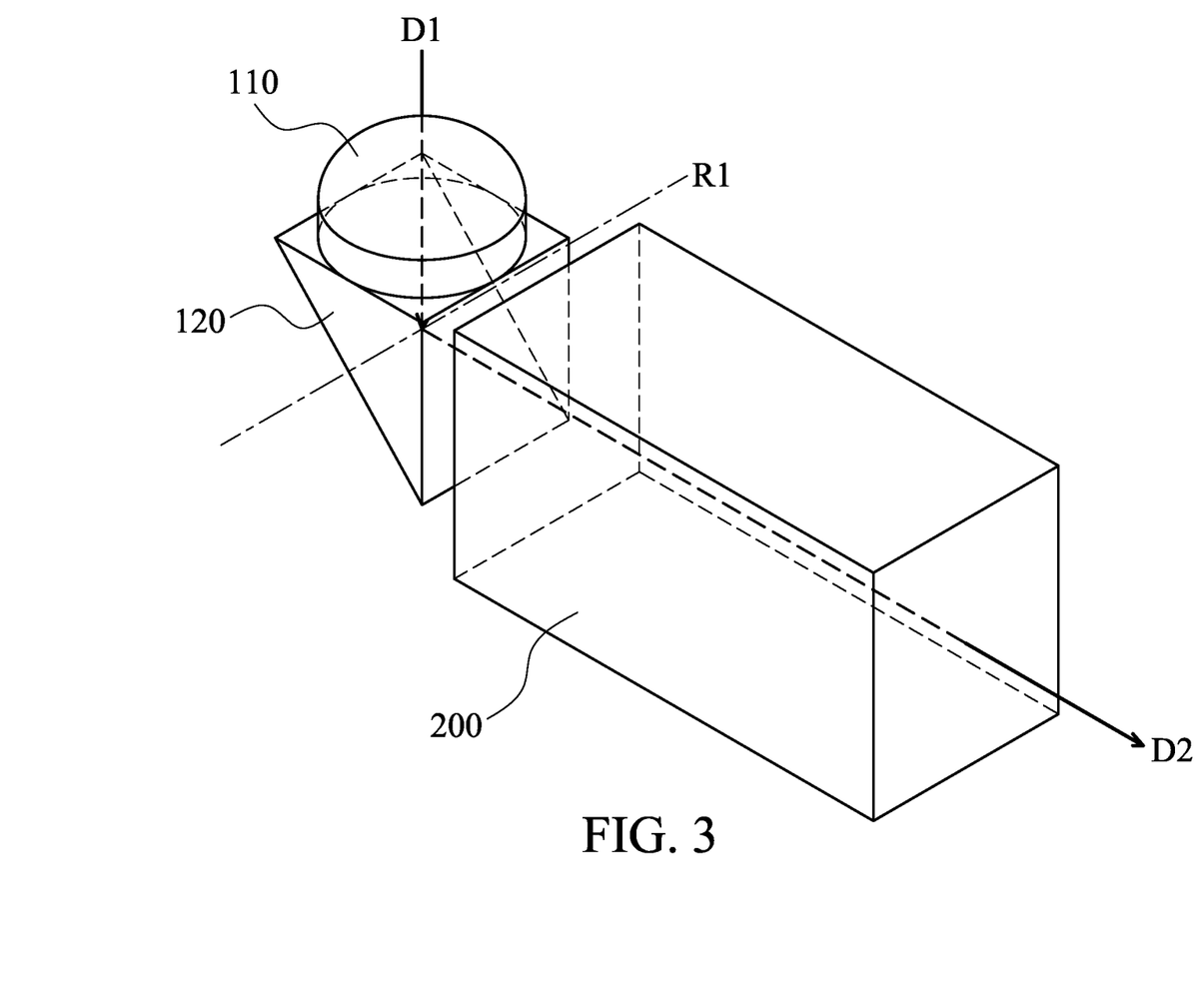
FIG. 3 is a partial perspective view of the optical system, according to some embodiments of the present disclosure.

Next, referring to FIG. 2 and FIG. 3, FIG. 3 is a partial perspective view of the optical system 10, according to some embodiments of the present disclosure. In some embodiments, the first optical module 100 further includes a third driving assembly 170, which drives the first optical path-adjusting element 120 to rotate about a first rotational axis R1. As shown in FIG. 3, the first rotational axis R1 substantially passes through the center of the reflecting surface of the first optical path-adjusting element 120, perpendicular to both the first direction D1, in which the light enters the first optical path-adjusting element 120, and the second direction D2, in which the light is emitted by the first optical path-adjusting element 120. The effect of optical image stabilization may be achieved by rotating the first optical path-adjusting element 120 during the operation of the optical system 10. Compensation for center alignment or tilting alignment may also be made in response to the changes of the optical axis of the first optical element 110, preventing the optic effects from deteriorating (e.g. avoid any occurrence of the image smiling curve). It should be noted that the rotation of the first optical path-adjusting element 120 is not a required feature of the present disclosure. For example, in some embodiments where the first optical path-adjusting element 120 is made of glass, the first optical path-adjusting element 120 may be secured to the first fixed portion 160 and rendered immovable relative to the first fixed portion 160, so as to maintain the stability of the entire mechanism.

Figure 4:
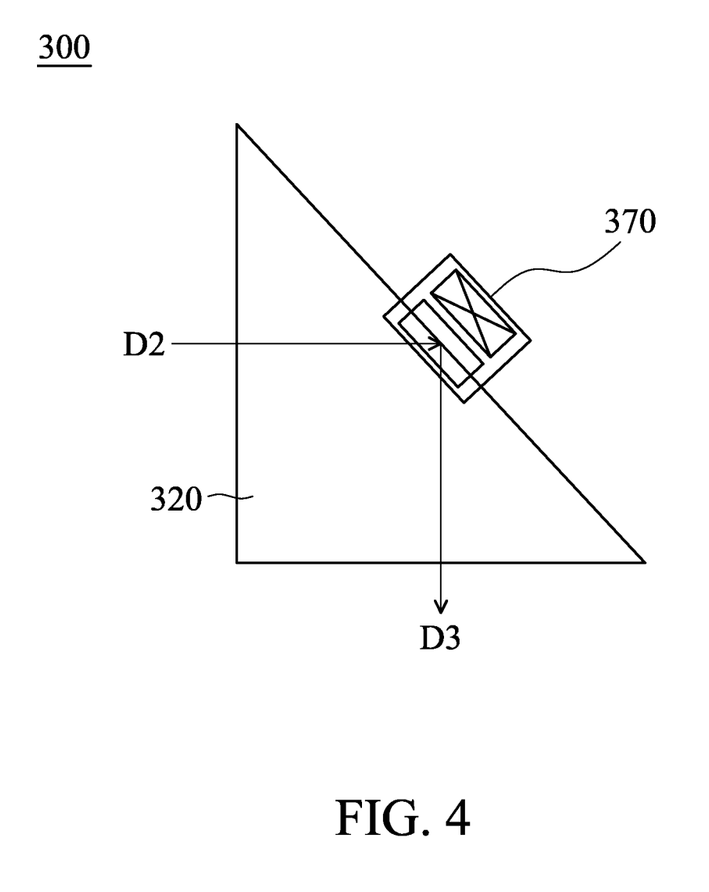
FIG. 4 is a top view of the third optical module, according to some embodiments of the present disclosure.
Figure 5:
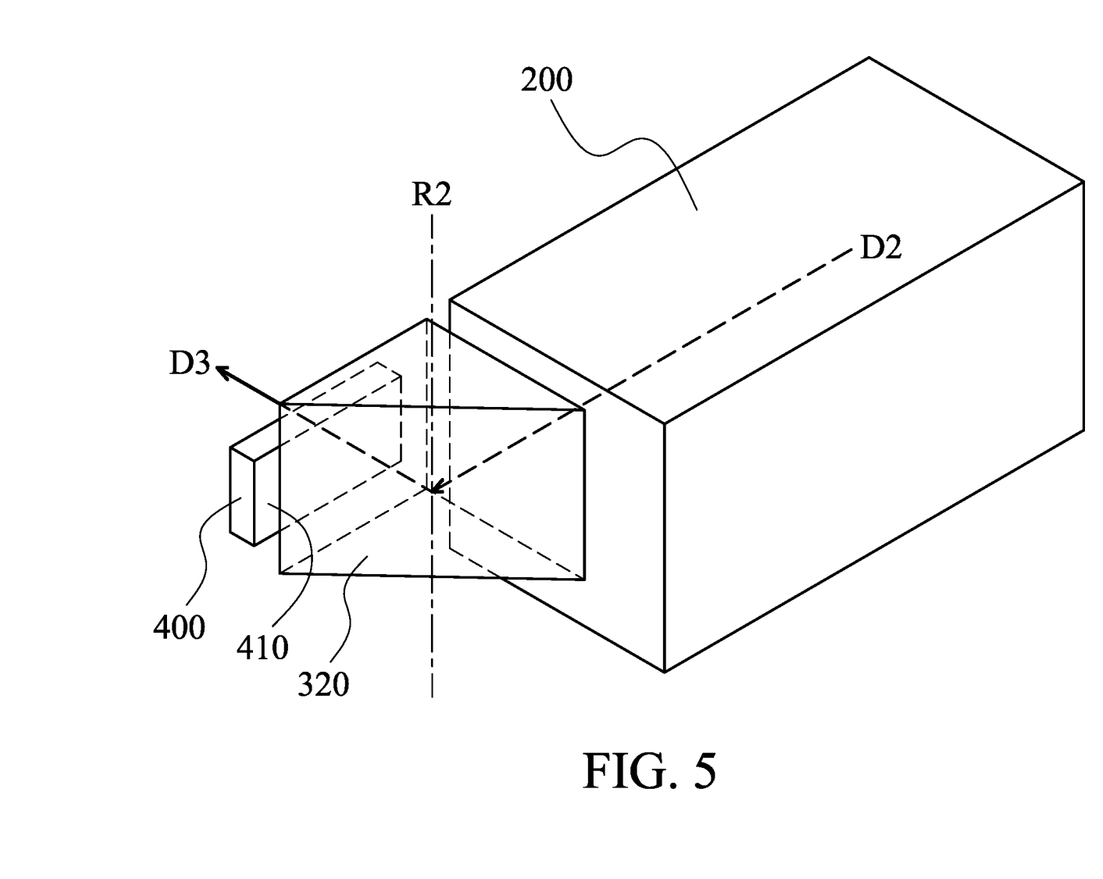
FIG. 5 is a partial perspective view of the optical system, according to some embodiments of the present disclosure.

Next, referring to FIG. 4 and FIG. 5, FIG. 4 is a top view of the third optical module 300, according to some embodiments of the present disclosure. FIG. 5 is a partial perspective view of the optical system 10, according to some embodiments of the present disclosure. In some embodiments, the third optical module 300 further includes a fourth driving assembly 370, which drives the second optical path-adjusting element 320 to rotate about a second rotational axis R2. As shown in FIG. 5, the second rotational axis R2 substantially passes through the center of the reflecting surface of the second optical path-adjusting element 320, perpendicular to both the second direction D2, in which the light enters the second optical path-adjusting element 320, and the third direction D3, in which the light is emitted by the second optical path-adjusting element 320. In some embodiments according to the present disclosure, the first rotational axis R1 is not parallel to the second rotational axis R2. In some particular embodiments, the first rotational axis R1 is perpendicular to the second rotational axis R2. Similar to the first optical path-adjusting element 120 described above, by rotating the second optical path-adjusting element 320 during the operation of the optical system 10, compensation for center alignment or tilting alignment may be made in response to the changes of the optical axis of the second optical module 200, improving the optic quality.

It should be noted that, although only one third driving assembly 170 and one fourth driving assembly 370 are respectively illustrated in FIG. 2 and FIG. 4, one or more third driving assembly 170 and one or more fourth driving assembly 370 may be installed based on practical requirements. As a result, effects of biaxial rotation or even horizontal and vertical displacements may be performed by the first optical path-adjusting element 120 and the second optical path-adjusting element 320.

In addition, there may be one or more additional driving assembly (not shown) disposed on the photosensing element 400, so that the photosensing element 400 may move or tilt. As such, the efficiency of receiving light that is emitted by the third optical module 300 may be improved. Auto focus may also be achieved.

Figure 6:
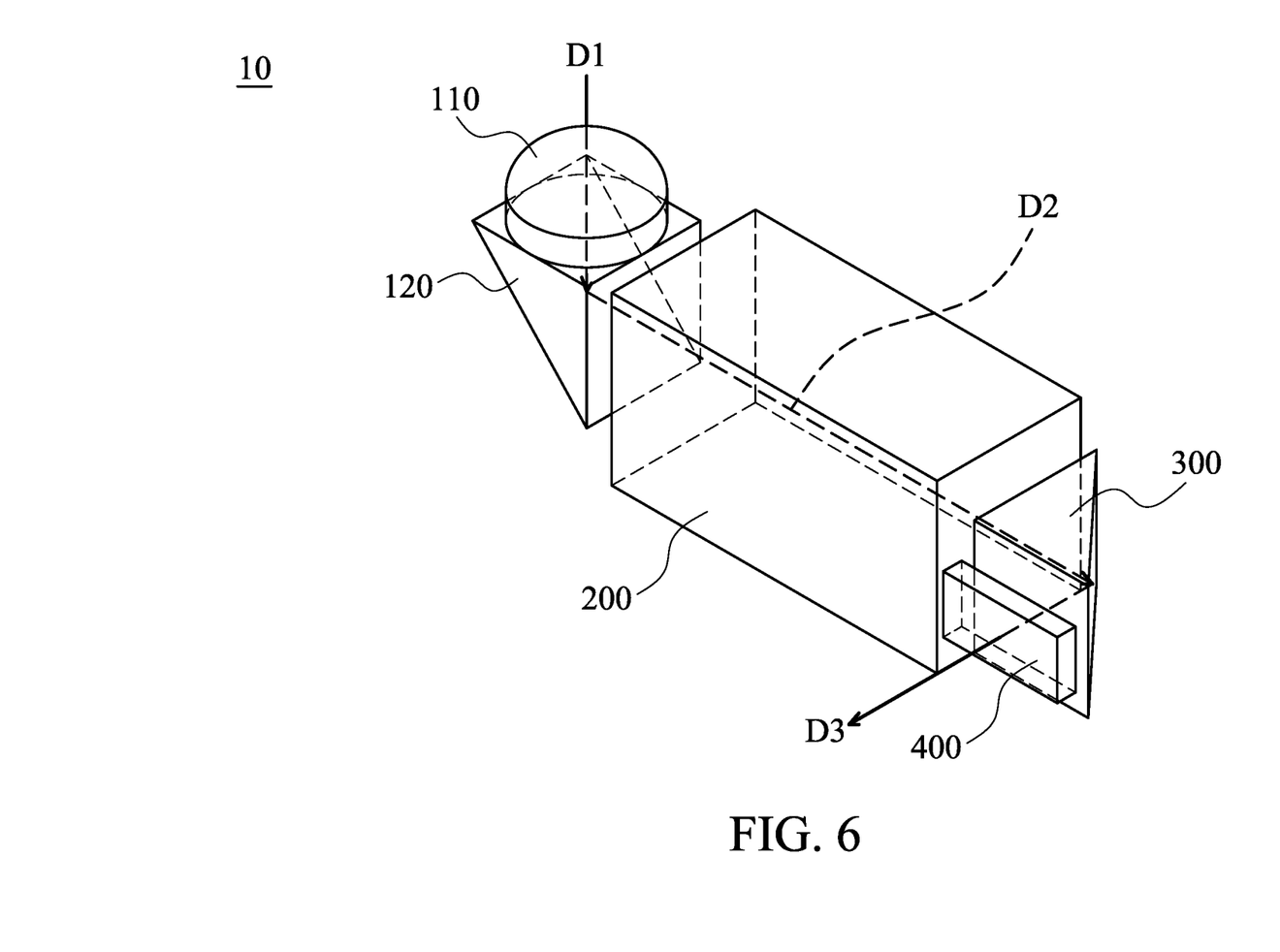
FIG. 6 is a perspective view of the optical system, according to some embodiments of the present disclosure.

Referring to FIG. 6, FIG. 6 is a perspective view of the optical system 10, according to some embodiments of the present disclosure. The optical system 10 shown in FIG. 6 is similar to the optical system 10 shown in FIG. 1. However, for the purpose of simplicity and clarity, some elements in the optical system 10 are not shown in FIG. 6. In this embodiment, the rays of light pass through the first optical element 110, the first optical path-adjusting element 120, the second optical module 200, the third optical module 300 in sequence, and finally arrive at the photosensing element 400. Specifically, the rays of light pass through the first optical element 110 substantially in the first direction D1, entering the first optical path-adjusting element 120, changed into the second direction D2 by the reflecting surface of the first optical path-adjusting element 120, passing through the second optical module 200 in the second direction D2, entering the third optical module 300, changed into the third direction D3 by the reflecting surface of the third optical module 300, and arriving at the photosensing element 400 in the third direction D3. By alternating the traveling direction of the light, the incident surface (e.g. the second surface S2 of the first optical element 110) and the receiving surface of the photosensing element 400 (e.g. the photosensing surface 410) do not necessarily have to be arranged along the same optical axis. This is advantageous for the miniaturization of the optical system 10 in electronic devices.

In addition, in some embodiments of the present disclosure, both the first optical path-adjusting element 120 and the second optical path-adjusting element 320 are right triangular prisms with light incident surfaces (e.g. the surface of the first optical path-adjusting element 120 facing the first optical element 110) and light emitting surfaces (e.g. the surface of the first optical path-adjusting element 120 facing the second optical module 200) that are different from the reflecting surfaces. Compared to common plane mirrors, since the light incident surface, the light emitting surface and the reflecting surface are the same surface for plane mirrors, the light incident surfaces of the first optical path-adjusting element 120 and the second optical path-adjusting element 320 may be perpendicular to the direction of incident light, creating a broader range for receiving rays of light. Similar advantages may be applied to the light emitting surfaces. Furthermore, the refractive index of the light may be changed by adjusting the materials (e.g. glass, plastic, acrylic, etc.) of the prism without changing the volume of the prism. Therefore, the diopters of the prisms may be adjusted. Consequently, the first optical path-adjusting element 120 and the second optical path-adjusting element 320 have the advantages of miniaturization and light weight. Obviously, in some other embodiments, the first optical path-adjusting element 120 and the second optical path-adjusting element 320 may also be plane mirrors that may reflect light.

Figure 7:
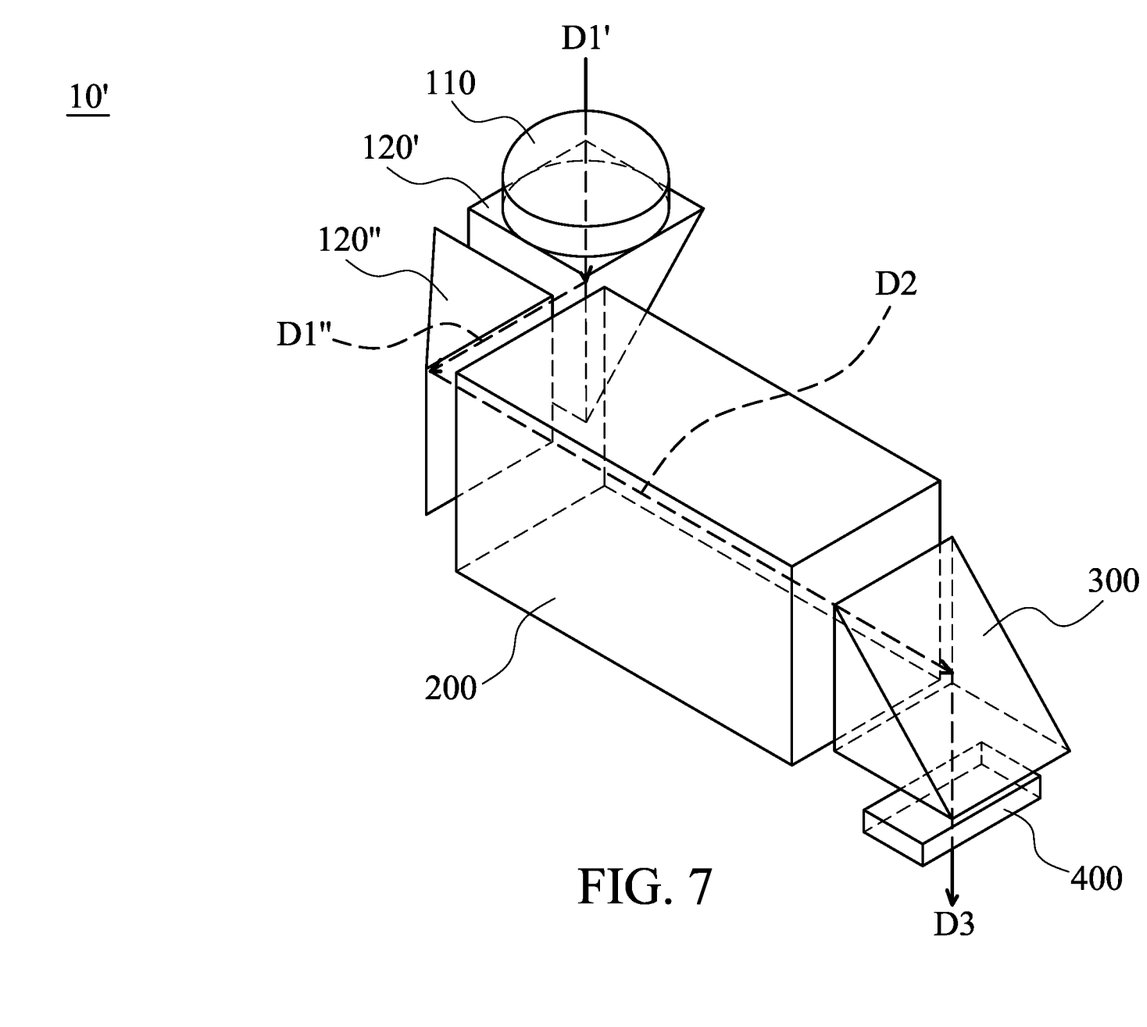
FIG. 7 is a perspective view of the optical system, according to some other embodiments of the present disclosure.

Next, referring to FIG. 7, FIG. 7 is a perspective view of the optical system 10', according to some other embodiments of the present disclosure. In FIG. 7, a first vertical optical path-adjusting element 120' and a first horizontal optical path-adjusting element 120" are utilized instead of the previous single first optical path-adjusting element 120. The structure of the first vertical optical path-adjusting element 120' and the first horizontal optical path-adjusting element 120" are similar to that of the first optical path-adjusting element 120, each having a reflecting surface. However, the direction of the reflecting surfaces are set differently. In this embodiment, the rays of light pass through the first optical element 110, the first vertical optical path-adjusting element 120', the first horizontal optical path-adjusting element 120", the second optical module 200, the third optical module 300 in sequence, and finally arrive at the photosensing element 400. Specifically, the rays of light pass through the first optical element 110 substantially in the first vertical direction D1', entering the first vertical optical path-adjusting element 120', changed into the first horizontal direction D1" by the reflecting surface of the first vertical optical path-adjusting element 120', changed into the second direction D2 by the reflecting surface of the first horizontal optical path-adjusting element 120", passing through the second optical module 200 in the second direction D2, entering the third optical module 300, changed into the third direction D3 by the reflecting surface of the third optical module 300, and arriving at the photosensing element 400 in the third direction D3. In some embodiments, each of the first vertical optical path-adjusting element 120' and the first horizontal optical path-adjusting element 120" may include a driving assembly (not shown), driving the first vertical optical path-adjusting element 120' and the first horizontal optical path-adjusting element 120" to move in different directions, so that the first vertical optical path-adjusting element 120' and the first horizontal optical path-adjusting element 120" may provide optical compensation in different directions. This may simplify the complexity of control and improve the optic quality.

In addition, it should be noted that the third direction D3, in which light enters the photosensing element 400, is parallel to the first vertical direction D1', in which light enters the first optical module 100. The traveling direction of light may be adjusted in accordance with the configuration within the space of electronic devices. The arrangement shown in the drawings of the present disclosure is not intended to be limiting.

In some embodiments, during the manufacturing process of the optical system 10 in the present disclosure, the first optical module 100 (including the first optical element 110, the first optical path-adjusting element 120, the positioning assembly 130, the first driving assembly 140, the first movable portion 150, the first fixed portion 160, and the third driving assembly 170, for example), the second optical module 200 (including the second optical element 210, the second driving assembly 240, the second movable portion 250, the second fixed portion 260, and the third optical element 280, for example), and the third optical module 300 (including the second optical path-adjusting element 320 and the fourth driving assembly 370, for example) may be formed as individual module blocks separately. After that, based on actual needs, the arrangements between each of the module blocks may be adjusted. As such, a variety of the optical system 10 may be obtained, and the manufacturing complexity may be lowered.

For example, the arrangement of the first optical element 110 and the first optical path-adjusting element 120 with respect to the second optical module 200 in FIG. 6 and the arrangement of the third optical module 300 and the photosensing element 400 with respect to the second optical module 200 in FIG. 7 may be combined, creating a different optical system, and vice versa. Other than rearranging each of the modules, each module may be rotated to obtain the desired traveling directions of the light. As such, users may arrange every module in any position, any sequence and any direction freely to meet requirements.

In summary, by disposing a plurality of liquid lenses, reflecting mirrors and lenses, the optical system 10 of the present disclosure may adjust the traveling directions of light and increase the angles for receiving rays of light. Furthermore, by converging or diverging the light through multiple optical elements, the optic quality may be improved within a limited volume. Better image qualities may be obtained by adding in multiple driving assemblies for adjusting the structures or positions of the optical elements. In addition, the application of the optical system 10 may be variable with the modular design and manufacture. Therefore, the present disclosure provides an optical system 10 that may achieve miniaturization, high optic quality and high applicability.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical system for receiving rays of light comprising a first optical module, wherein the first optical module comprises:
   a first optical element having a first optical axis, wherein the direction of rays of light pass through the first optical element in a first direction, the first optical element comprising:
      a first surface, having a planar structure that is not parallel to the first optical axis, facing the first optical path-adjusting element; and
      a second surface opposite to the first surface, having a non-planar structure that is not parallel to the first optical axis;
   a first optical path-adjusting element corresponding to the first optical element, wherein the rays of light are redirected to a second direction by the first optical path-adjusting element;
   a first driving assembly disposed at the first optical element, varying the structure of the second surface;
   a first movable portion connected to the first optical element; and
   a first fixed portion having a first housing, wherein the first housing has a first accommodating space, in which the first optical path-adjusting element is accommodated, and wherein the first movable portion is movable relative to the first fixed portion, wherein the first optical element and the first optical path-adjusting element are arranged along the first optical axis, wherein the first driving assembly includes a coil and a magnetic element, wherein the second surface has a curvature that is adjustable by the first driving assembly, whereby the state of the rays of light passing through the first optical element is adjusted, wherein the first driving assembly drives the first movable portion to move relative to the first fixed portion, wherein the first surface and the second surface are arranged along the first optical axis, wherein the first optical path-adjusting element has a third surface, having a planar structure, facing the first optical element, wherein the first surface and the third surface are parallel, and there is a gap between the first surface and the third surface, including gas inside the gap, wherein the first optical module further comprises a positioning assembly disposed between the first optical element and the first optical path-adjusting element, for maintaining the gap between the first optical element and the first optical path-adjusting element, wherein the positioning assembly overlaps the first optical element, the first optical path-adjusting element, and the first driving assembly when viewed along the first optical axis, and wherein the first surface and the third surface both remain planar when the first driving assembly adjusts the curvature of the second surface.

2. The optical system as claimed in claim 1, wherein the first surface is perpendicular to the first optical axis, and the second surface has a curved structure.

3. The optical system as claimed in claim 1, wherein the first optical path-adjusting element does not move relative to the first fixed portion, and the first optical path-adjusting element includes a glass material.

4. The optical system as claimed in claim 1, further comprising a second optical module, wherein the second optical module comprises:
a second optical element having a second optical axis, wherein the second optical axis is parallel to the second direction;
wherein the first optical module and the second optical module are arranged along the second optical axis, wherein the first driving assembly at least partially overlaps the second optical module, and the first optical element at least partially overlaps the second optical module when viewed along the second optical axis.

5. The optical system as claimed in claim 4, wherein the first optical axis is perpendicular to the second optical axis.

6. The optical system as claimed in claim 4, wherein the second optical module further comprises:
a second fixed portion having a second housing, wherein the second housing has a second accommodating space, in which the second optical element is accommodated, and wherein the second housing is fixedly connected to the first optical module.

7. The optical system as claimed in claim 6, wherein the second optical module further comprises:
a second movable portion connected to the second optical element;
a second driving assembly driving the second movable portion to move relative to the second fixed portion; and
a third optical element accommodated in the second accommodating space, wherein the third optical element and the second optical element are arranged along the second optical axis;
wherein a first diopter of the first optical element is greater than a second diopter of the second optical element and a third diopter of the third optical element;
wherein the third diopter is different from the second diopter.

8. The optical system as claimed in claim 7, wherein the first driving assembly varies the first diopter of the first optical element within a first range;
wherein any number within the first range is greater than the second diopter and the third diopter.

9. The optical system as claimed in claim 7, wherein the third optical element is fixedly disposed at the second fixed portion, and the second optical element is movable relative to the third optical element.

10. The optical system as claimed in claim 7, wherein the first optical element includes liquid, the second optical element includes a plastic material, and the third optical element includes a glass material.

11. The optical system as claimed in claim 7, wherein the rays of light pass through the first optical element, the first optical path-adjusting element, the second optical element and the third optical element in sequence.

12. The optical system as claimed in claim 4, further comprising a third optical module, wherein the third optical module comprises:
a second optical path-adjusting element, wherein the rays of light are redirected from the second direction to a third direction by the second optical path-adjusting element;
wherein of the first direction, the second direction, and the third direction, no two are parallel.

13. The optical system as claimed in claim 12, wherein the first optical module further comprises:
a third driving assembly driving the first optical path-adjusting element to rotate about a first rotational axis;
wherein the first rotational axis is perpendicular to both the first direction and the second direction.

14. The optical system as claimed in claim 13, wherein the third optical module further comprises:
a fourth driving assembly driving the second optical path-adjusting element to rotate about a second rotational axis;
wherein the first rotational axis is not parallel to the second rotational axis;
wherein the second rotational axis is perpendicular to both the second direction and the third direction.

15. The optical system as claimed in claim 14, wherein of the first direction, the second direction, and the third direction, two are perpendicular, and the first rotational axis is perpendicular to the second rotational axis.

16. The optical system as claimed in claim 12, further comprising:
a photosensing element having a photosensing surface, wherein the photosensing surface faces the third optical module;
wherein after passing through the second optical path-adjusting element of the third optical module, the rays of light reach the photosensing element.

17. The optical system as claimed in claim 1, wherein the projected area of the opening of the positioning assembly is smaller than both the projected area of the first surface and the projected area of the third surface when viewed along the first optical axis.

18. The optical system as claimed in claim 1, wherein the coil is secured to the first fixed portion, and wherein the magnetic element is the first movable portion.

19. The optical system as claimed in claim 1, wherein the gas inside the gap is atmospheric air.

20. An optical system for receiving rays of light comprising a first optical module, the first optical module comprising:
- a first optical element having a first optical axis, wherein the direction of rays of light pass through the first optical element in a first direction, the first optical element comprising:
  - a first surface, having a planar structure that is not parallel to the first optical axis, facing the first optical path-adjusting element; and
  - a second surface opposite to the first surface, having a non-planar structure that is not parallel to the first optical axis;
- a first optical path-adjusting element corresponding to the first optical element, wherein the rays of light are redirected to a second direction by the first optical path-adjusting element;
- a first driving assembly disposed at the first optical element, varying the structure of the second surface;
- a first movable portion connected to the first optical element; and
- a first fixed portion having a first housing, wherein the first housing has a first accommodating space, in which the first optical path-adjusting element is accommodated, and wherein the first movable portion is movable relative to the first fixed portion, wherein the first optical element and the first optical path-adjusting element are arranged along the first optical axis, wherein the first driving assembly includes a coil and a magnetic element, wherein the second surface has a curvature that is adjustable by the first driving assembly, whereby the state of the rays of light passing through the first optical element is adjusted, wherein the first driving assembly drives the first movable portion to move relative to the first fixed portion, wherein when viewed along the first optical axis, the first driving assembly and the first optical path-adjusting element do not overlap, wherein the first surface and the second surface are arranged along the first optical axis, wherein the first optical path-adjusting element has a third surface, having a planar structure, facing the first optical element, wherein the first surface and the third surface are parallel, and there is a gap between the first surface and the third surface, including gas inside the gap, wherein the first optical module further comprises a positioning assembly disposed between the first optical element and the first optical path-adjusting element, for maintaining the gap between the first optical element and the first optical path-adjusting element, wherein the positioning assembly overlaps the first optical element, the first optical path-adjusting element, and the first driving assembly when viewed along the first optical axis, and wherein the first surface and the third surface both remain planar when the first driving assembly adjusts the curvature of the second surface.

21. The optical system as claimed in claim 20, wherein the projected area of the opening of the positioning assembly is smaller than both the projected area of the first surface and the projected area of the third surface when viewed along the first optical axis.

22. The optical system as claimed in claim 20, wherein the coil is secured to the first fixed portion, and wherein the magnetic element is the first movable portion.

23. The optical system as claimed in claim 20, wherein the gas inside the gap is atmospheric air.

\* \* \* \* \*